(12) United States Patent
Tessler et al.

(10) Patent No.: US 12,395,509 B2
(45) Date of Patent: Aug. 19, 2025

(54) COMPUTER-BASED SYSTEMS CONFIGURED FOR AUTOMATIC DETECTION OF A VERIFIED IDENTITY RELATED TO INTERACTION SESSIONS AND METHODS OF USE THEREOF

(71) Applicant: Capital One Services, LLC, McLean, VA (US)

(72) Inventors: Leeyat Bracha Tessler, Arlington, VA (US); Salik Shah, Washington, DC (US); Jennifer Kwok, Brooklyn, NY (US); Abhay Donthi, Washington, DC (US); Dwij Trivedi, Oakton, VA (US)

(73) Assignee: Capital One Services, LLC, McLean, VA (US)

( * ) Notice: Subject to any disclaimer, the term of this patent is extended or adjusted under 35 U.S.C. 154(b) by 234 days.

(21) Appl. No.: 18/052,145

(22) Filed: Nov. 2, 2022

(65) Prior Publication Data
US 2024/0146751 A1 May 2, 2024

(51) Int. Cl.
*H04L 9/40* (2022.01)
*H04M 3/22* (2006.01)

(52) U.S. Cl.
CPC ........ *H04L 63/1425* (2013.01); *H04L 63/102* (2013.01); *H04L 63/1416* (2013.01); *H04M 3/2281* (2013.01)

(58) Field of Classification Search
CPC ............. H04M 3/2281; H04L 63/1416; H04L 63/102; H04L 63/1425
USPC .......................................................... 726/4
See application file for complete search history.

(56) References Cited

U.S. PATENT DOCUMENTS

| | | |
|---|---|---|
| 8,918,466 B2 | 12/2014 | Yu |
| 9,633,203 B2 | 4/2017 | Sanjeev et al. |
| 9,716,726 B2 | 7/2017 | Pastore et al. |
| 10,200,317 B2 | 2/2019 | Lee |
| 10,270,864 B2 | 4/2019 | Sagar et al. |
| 10,521,070 B2 | 12/2019 | Plasmeier |
| 11,044,268 B2 | 6/2021 | Pastore et al. |
| 11,182,045 B2 | 11/2021 | Johari |

(Continued)

FOREIGN PATENT DOCUMENTS

| | | |
|---|---|---|
| EP | 3021550 A1 | 5/2016 |
| WO | 2008/083087 A2 | 7/2008 |
| WO | 2020/171725 A1 | 8/2020 |

*Primary Examiner* — Benjamin A Kaplan
(74) *Attorney, Agent, or Firm* — Greenberg Traurig, LLP

(57) ABSTRACT

In some embodiments, the present disclosure provides an exemplary method that may include steps of receiving a permission indicator identifying a permission by the first user to detect calls being received by the computing device; receiving an indication of a particular call being received from a second user at a particular phone number; detecting a triggering condition to verify when the particular phone number is associated with the particular entity; instructing the computing device to execute a computer routine to verify when the particular phone number is associated with the particular entity; receiving an indication from the computer routine when the particular phone number is not associated with the particular entity; instructing the computing device to perform at least one security action; and instructing to notify a second computing device associated with the particular entity with information pertaining to the particular call.

19 Claims, 7 Drawing Sheets

(56) References Cited

U.S. PATENT DOCUMENTS

| | | |
|---|---|---|
| 2007/0047523 A1 | 3/2007 | Jiang |
| 2010/0161734 A1 | 6/2010 | Wang |
| 2014/0195972 A1 | 7/2014 | Lee et al. |
| 2018/0152411 A1 | 5/2018 | Lee et al. |
| 2023/0141773 A1* | 5/2023 | Ramadhane .......... H04L 9/3239 |
| | | 455/410 |
| 2023/0164198 A1* | 5/2023 | Bhattacharjee ..... H04L 65/1016 |
| | | 370/271 |

* cited by examiner

COMPUTER-BASED SYSTEMS CONFIGURED FOR AUTOMATIC DETECTION OF A VERIFIED IDENTITY RELATED TO INTERACTION SESSIONS AND METHODS OF USE THEREOF

FIELD OF TECHNOLOGY

The present disclosure generally relates to computer-based systems configured for automatic detection of a verified identity related to an incoming interaction session and methods of use thereof.

BACKGROUND OF TECHNOLOGY

Typically, an extraction of personal and/or sensitive information associated with an individual that occurs during a phone call is not detected until after the phone call is terminated or the extraction is complete. This extraction of information may open the individual up to future attacks, increased security risks, and a decrease in efficiency in providing secure interaction session with authenticated individuals.

SUMMARY OF DESCRIBED SUBJECT MATTER

In some embodiments, the present disclosure provides an exemplary technically improved computer-based method that includes at least the following steps: receiving, by one or more processors, from a computing device of a first user, a permission indicator identifying a permission by the first user to detect calls being received by the computing device; receiving, by the one or more processors, from the computing device, an indication of a particular call being received from a second user at a particular phone number, the second user claiming to be associated with a particular entity; detecting, by the one or more processors, a triggering condition to verify when the particular phone number is associated with the particular entity; instructing, by the one or more processors and responsive to detecting the triggering condition, the computing device to execute a computer routine to verify when the particular phone number is associated with the particular entity; receiving, by the one or more processors, an indication from the computer routine when the particular phone number is not associated with the particular entity; instructing, by the one or more processors, the computing device to perform at least one security action; and instructing, by the one or more processors, to notify a second computing device associated with the particular entity with information pertaining to the particular call.

In some embodiments, the present disclosure provides an exemplary technically improved computer-based system that includes at least the following components of: at least one processor configured to execute software instructions that cause the at least one processor to perform steps to: receive, by one or more processors, from a computing device of a first user, a permission indicator identifying a permission by the first user to detect calls being received by the computing device; receive, by the one or more processors, from the computing device, an indication of a particular call being received from a second user at a particular phone number, the second user claiming to be associated with a particular entity; detect, by the one or more processors, a triggering condition to verify when the particular phone number is associated with the particular entity; instruct, by the one or more processors and responsive to detecting the triggering condition, the computing device to execute a computer routine to verify when the particular phone number is associated with the particular entity; receive, by the one or more processors, an indication from the computer routine when the particular phone number is not associated with the particular entity; instruct, by the one or more processors, the computing device to perform at least one security action; and instruct, by the one or more processors, to notify a second computing device associated with the particular entity with information pertaining to the particular call.

BRIEF DESCRIPTION OF DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
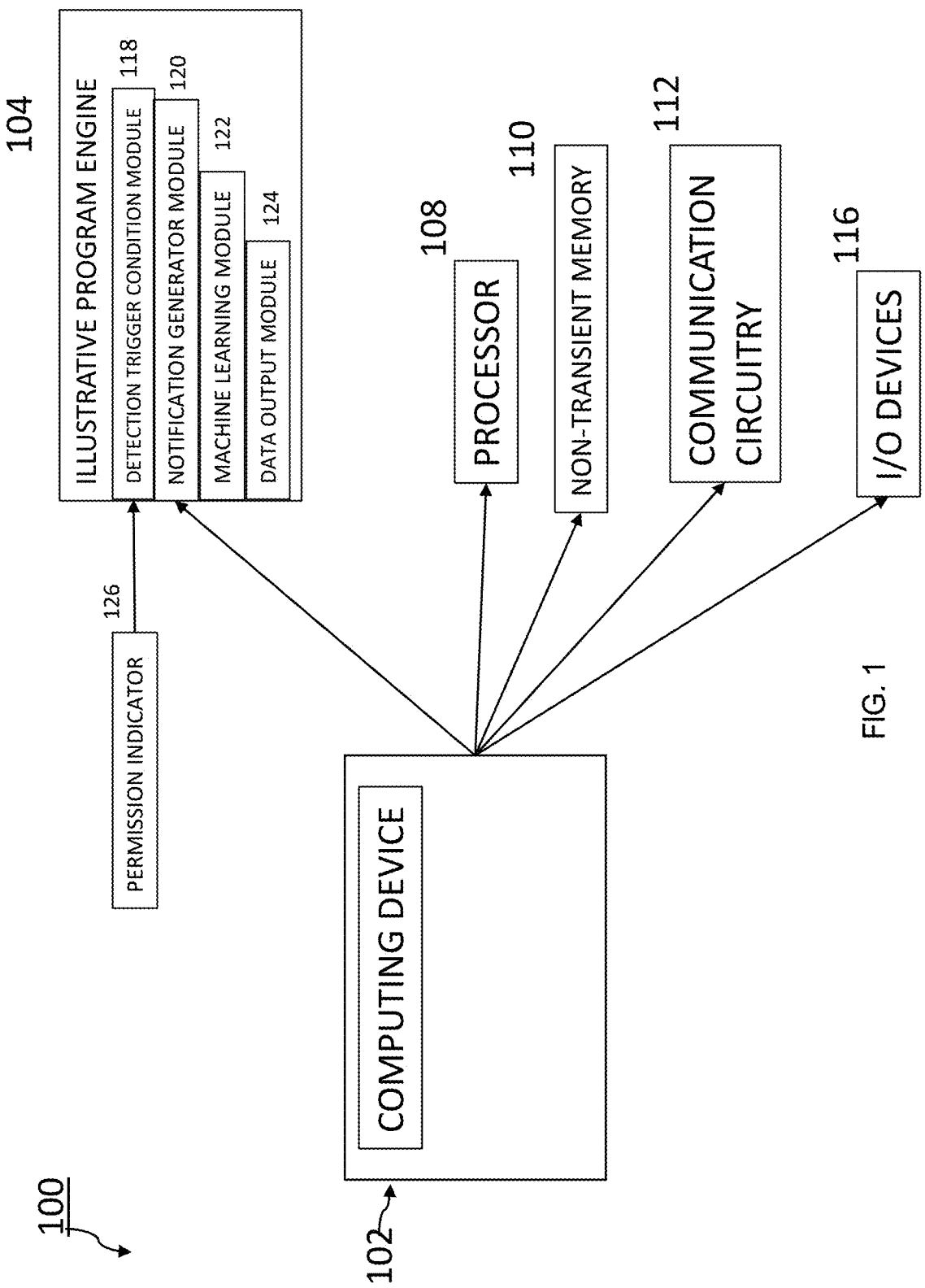
FIG. 1 depicts a block diagram of an exemplary computer-based system and platform for automatically detecting a triggering condition to verify when a particular phone number is associated with a particular entity, in accordance with at least one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a creator interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, daily, several days, weekly, monthly, etc.

As used herein, the term "runtime" corresponds to any behavior that is dynamically determined during an execution of a software application or at least a portion of software application.

Embodiments of the present disclosure recognize a technological computer-centered problem associated with triggered content pushed over the internet and limited detection of incoming phone calls. This technical problem is exacerbated by a plurality of scams or attacks of a computing device associated with a particular user by an external third-party or individual being detected after the particular user interacts with the plurality of scams or attacks, where each scam or attack is for the purpose of extracting sensitive information from the particular user. In some instances, the detection of a plurality of scams or attacks of the computing device after the phone call has ended and after the plurality of scams or attacks have occurred, which decreases a level of security provided to the particular user and reduces the efficiency capable of preventing the exposure of the extraction of sensitive information related with the particular user. Embodiments of the present disclosure detail a computer-centric technological solution that may automatically detect a triggering condition to verify when the particular phone number is associated with the particular entity, execute a computer routine to verify the particular phone number, and receive an indication from the computer routine in response to a determination that the particular phone number does not match the particular entity. In some embodiments, a practical solution may require instructing a second computing device associated with the particular entity with information pertaining to the particular scam or attack via a notification.

FIG. 1 depicts a block diagram of an exemplary computer-based system and platform for automatically generating a notification associated with at least one data stack at a predetermined period of time based on a duration of the at least one data stack, in accordance with one or more embodiments of the present disclosure.

In some embodiments, a computing system 100 may include a computing device 102 associated with a creator and an illustrative program engine 104. In some embodiments, the program 104 may be stored on the computing device 102. In some embodiments, the program 104 may reside on a server computing device 106 (not shown). In some embodiments, the computing device 102 may include a processor 108, a non-transient memory 110, a communication circuitry 112 for communicating over a communication network 114 (not shown), and input and/or output (I/O) devices 116 such as a keyboard, mouse, a touchscreen, and/or a display, for example. In some embodiments, the computing device 102 may refer to a smart phone.

In some embodiments, the illustrative program engine 104 may be configured to instruct the processor 108 to execute one or more software modules such as a detection trigger condition module 118, a notification generator module 120, a machine learning model module 122, and a data output module 124.

In some embodiments, an exemplary detection trigger condition module 118, of the present disclosure, may utilize at least one machine learning algorithm described herein, to automatically detect a triggering condition to verify that a particular phone number is associated with a particular entity and dynamically execute a computer routine to verify that the particular phone number is associated the particular entity, where the computer routine may refer to at least one security action. Typically, execution of the computer routine to perform a security action is responsive to a transmission from a user after a condition is detected and transmitted to the notice of the user, which creates an opportunity for sensitive information to be extracted prior to the user receiving the notice of the detected condition and transmitting instructions to perform the security action. In some embodiments, the exemplary detection trigger condition module 118 may receive a permission indicator 126 identifying a permission by the user to detect a plurality of interaction sessions being received by the computing device 102. In some instances, the identified permission may refer to a pre-generated permission associated with a plurality of preferences associated with the user. For example, the user may transit a permission allowing a software program on the computing device 102 to monitor activity of the computing device 102 for a predetermined period of time. In some embodiments, the exemplary detection trigger condition module 118 may receive an indication of a particular interaction session being received from a different user at a particular session interaction parameter. In some instances, the indication of a particular interaction session may refer to an incoming phone call, facetime, conference call, or email. In some instances, the particular session interaction parameter may refer to a session interaction certificate, STIR/SHAKEN certificate, or a particular IP address associated with a particular user. In some instances, the different user may refer to a second user and/or a particular entity. In some embodiments, the exemplary detection trigger condition module 118 may detect a triggering condition to verify when the particular session interaction parameter is associated with the particular entity. In some instances, the particular entity may refer to a verified merchant, a verified user, and/or a call center. In some instances, the triggering condition may refer to an identification of a suspicious session interaction parameter, an interruption in ownership during a monitoring of the computing device 102 within a predetermined period of time, an authentication of at least two identities associated with the first user and the second user associated with the particular interaction session, and/or an extraction of sensitive information from the computing device 102 associated with the first user. In some embodiments, the exemplary detection trigger condition module 118 may detect the triggering condition by detecting input from the user associated with the computing device 102. In some embodiments, the exemplary detection trigger condition module 118 may detect the triggering condition by monitoring content of the particular interaction session between a first user and a second user. In some instances, the first user and the second user may refer to the particular user and the different user associated with the particular interaction session. In some embodiments, the exemplary detection trigger condition module 118 may instruct the computing device 102 to execute a computer routine to verify when the particular session interaction parameter is associated with the particular entity. In some instances, the computer routine may refer to a plurality of security actions to recover extracted sensitive information and/or prevent the extraction of sensitive information associated with the user. For example, the computer routine may prevent an extraction of sensitive information associated with the first user from the computing device 102. In some embodiments, the exemplary detection trigger condition module 118 may instruct the computing device 102 to execute the computer routine to verify when the particular session interaction parameter is associated with the particular entity in response to detecting the triggering condition. In some embodiments, the exemplary detection trigger condition module 118 may execute the computer routine to verify when the particular session interaction parameter is associated with the particular entity utilizing a messaging application. In some instances, the messaging application may be automatically operated by at least one bot on behalf of the user. In some embodiments, the exemplary detection trigger condition module 118 may execute the computer routine to verify when the particular session interaction parameter is associated with the particular entity utilizing an application associated with the entity. In some instances, the application associated with the entity may by automatically operated by a bot on behalf of the user. In some embodiments, the exemplary detection trigger condition module 118 may receive an indication from the computer routine when the particular session interaction parameter is not associated with the particular entity. In some instances, the indication from the computer routine may refer to a generated notification transmitted to the user to detail the detected triggering condition. In some instances, the indication that the particular session interaction parameter is not associated with the particular entity may refer to an indication that the second user is engaging a man-in-the-middle attack and the first user and the particular entity. In some embodiments, the exemplary detection trigger condition module 118 may verify when the particular session interaction parameter is not associated with the particular entity based on an indication of whether the particular call is inbound or outbound according to the first user, an indication of whether the particular call is inbound or outbound according to a call center associated with the particular entity, information of agents associated with the call center, or call logs of the call center. In some embodiments, the exemplary detection trigger condition module 118 may instruct the computing device 102 to perform at least one security action. In some instances, the at least one security action may refer to at least one of, but not limited to, conferencing a user legitimately associated with the particular entity into the particular interaction session, causing the particular interaction session to terminate, and/or causing the user legitimately associated with the particular entity to terminate another interaction session with the second user. In some embodiments, the exemplary detection trigger condition module 118 may instruct the computing device 102 to notify a second computing device associated with the particular entity with information pertaining to the particular interaction session. In some embodiments, the exemplary detection trigger condition module 118 may instruct the computing device 102 to update a graphical user interface (GUI) associated with the particular interaction session to display to the first user a GUI element, where the GUI element is operable to execute the at least one computer routine.

In some embodiments, the present disclosure describes systems for utilizing at least one machine learning algorithm of a plurality of machine learning algorithms within the machine learning module 120 that may automatically detect a triggering condition to verify that a particular phone number is associated with a particular entity and dynamically execute a computer routine to verify that the particular phone number is associated the particular entity, where the computer routine may refer to at least one security action. In some embodiments, the machine learning module 120 may receive a permission indicator 126 identifying a permission from a first user to detect incoming interaction session being received by the computing device 102. In some embodiments, the machine learning module 120 may receive an indication of a particular incoming interaction session being received from a second user at a particular session interaction parameter. In some instances, the second user may refer to a particular entity. In some embodiments, the machine learning module 120 may detect a triggering condition to verify when the particular session interaction parameter is associated with the particular entity. In some embodiments, the machine learning module 120 may execute a computer routine to verify when the particular session interaction parameter is associated with the particular entity. In some embodiments, the machine learning module 120 may receive an indication from the computer routine when the particular session interaction parameter fails to match the particular session interaction parameter associated with the particular entity. In some embodiments, the machine learning module 120 may perform at least one security action of a plurality of security actions. In some embodiments, the machine learning module 120 may notify a second computing device (not shown) associated with the particular entity with a generated notification. In some instances, the generated notification may refer to information pertaining to the particular interaction session. In some embodiments, output of the machine learning module 120 may refer to the execution of the computer routine to verify when the particular session interaction parameter is associated with the particular entity. In some embodiments, the output of the machine learning module 120 may refer to the generated notification transmitted to the second computing device associated with the particular entity.

In some embodiments, the data output module 122 may detect the triggering condition to verify when the particular session interaction parameter is associated with the particular entity. In some embodiments, the data output module 122 may execute the computer routine to verify when the particular session interaction parameter is associated with the particular entity in response to detecting the triggering condition. In some embodiments, the data output module 122 may generate an indication from the computer routine when the particular session interaction parameter fails to match the particular session interaction parameter associated with the particular entity. In some embodiments, the data output module 122 may perform at least one security action of the plurality of security actions. In some embodiments, the data output module 122 may transmit the generated notification to the second computing device associated with the particular entity.

In some embodiments, the illustrative program engine 104 may receive a permission indicator 126 identifying a permission by a first user to detect calls being received by the computing device 102. In some embodiments, the illustrative program engine 104 may receive an indication of a particular interaction session being received from a second user at a particular session interaction parameter. In some instances, the session interaction parameter may refer to a plurality of phone numbers associated with a plurality of users. In some embodiments, the illustrative program engine 104 may detect a triggering condition to verify when the particular session interaction parameter is associated with the particular entity. In some embodiments, the illustrative program engine 104 may instruct the computing device 102 to execute a plurality of computer routines to verify when the particular session interaction parameter is associated with the particular entity. In some embodiments, the illustrative program engine 104 may receive an indication from the computer routine when the particular session interaction parameter is not associated with the particular entity. In some embodiments, the illustrative program engine 104 may instruct the computing device 102 to perform a plurality of security actions. In some embodiments, the illustrative program engine 104 may notify a second computing device associated with the particular entity with information pertaining to the particular interaction session.

In some embodiments, the non-transient memory 110 may store the plurality of security actions to perform in response to detecting the triggering condition. In some embodiments, the non-transient memory 110 may store a plurality of computer routine of a plurality of computer routines in response to detecting the triggering condition. In some embodiments, the non-transient memory 110 may store a generated notification that may be transmitted to the second computing device associated with the particular entity.

Figure 2:
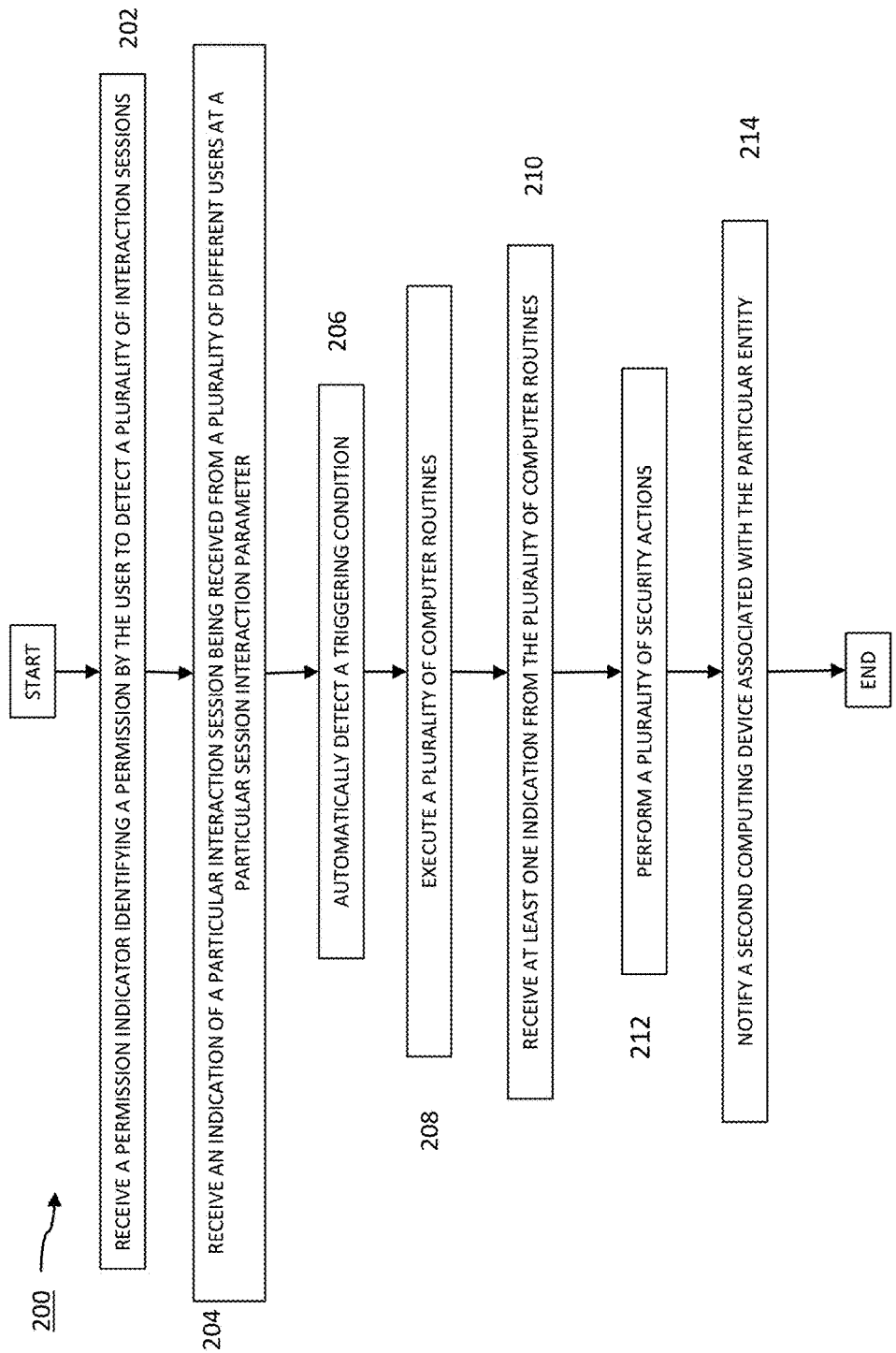
FIG. 2 is a flowchart illustrating operational steps for automatically detecting a triggering condition to verify when a particular phone number is associated with a particular entity, in accordance with at least one or more embodiments of the present disclosure.

FIG. 2 is a flowchart 200 illustrating operational steps for automatically detecting a triggering condition to verify when a particular phone number is associated with a particular entity, in accordance with at least one or more embodiments of the present disclosure.

In step 202, the illustrative program engine 104 within the computing device 102 may be programmed to receive a permission indicator 126 identifying a permission by the user to detect a plurality of interaction sessions being received by the computing device 102. In some embodiments, the illustrative program engine 104 may utilize a permission indicator 126 to identify the permission by the user to detect the plurality of interaction sessions being received by the computing device 102, where the permission may refer to a pre-generated permission associated with a plurality of preferences associated with the user.

In step 204, the illustrative program engine 104 may receive an indication of a particular interaction session being received from a plurality of different users at a particular session interaction parameter. In some embodiments, the illustrative program engine 104 may receive the indication of the particular interaction session of a plurality of interaction sessions being received from the plurality of different users based on an analysis of a plurality of session interaction parameters, where the particular session interaction parameter is associated with at least one different user of the plurality of users. In some embodiments, the illustrative program engine 104 may utilize the permission indicator 126 to receive the identification of the particular interaction session.

In step 206, the illustrative program engine 104 may automatically detect a triggering condition. In some embodiments, the illustrative program engine 104 may automatically detect the triggering condition to verify when the particular session interaction parameter is associated with the particular entity. In some embodiments, the exemplary detection trigger condition module 118 may detect the triggering condition by detecting input from the user associated with the computing device 102. In some embodiments, the exemplary detection trigger condition module 118 may detect the triggering condition by monitoring content of the particular interaction session between a first user and a second user.

In step 208, the illustrative program engine 104 may execute a plurality of computer routines. In some embodiments, the illustrative program engine 104 may execute a plurality of computer routines to verify when the particular session interaction parameter is associated with the particular entity. In some embodiments, the illustrative program engine 104 may execute a plurality of computer routines to prevent a transmission of sensitive information associated with the user from the computing device 102 to a different computing device. In some embodiments, the illustrative program engine 104 may instruct the computing device 102 to execute a computer routine to verify when the particular session interaction parameter is associated with the particular entity. In some embodiments, the exemplary detection trigger condition module 118 may execute the computer routine to verify when the particular session interaction parameter is associated with the particular entity utilizing a messaging application. In some embodiments, the exemplary detection trigger condition module 118 may execute the computer routine to verify when the particular session interaction parameter is associated with the particular entity utilizing an application associated with the entity.

In step 210, the illustrative program engine 104 may receive at least one indication from the plurality of computer routines. In some embodiments, the illustrative program engine 104 may receive the at least one indication from the plurality of computer routines when the particular session interaction parameter is not associated with the particular entity. In some embodiments, the illustrative program engine 104 may receive the at least one indication from the plurality of computer routines based on an analysis of the particular session interaction parameter, where the particular session interaction parameter fails to patch the session interaction parameter associated with the particular entity.

In step 212, the illustrative program engine 104 may perform a plurality of security actions. In some embodiments, the illustrative program engine 104 may perform at least one security action of the plurality of security actions in response to receiving the at least one indication from the plurality of computer routines based on the analysis of the particular session interaction parameter. In some embodiments, the illustrative program engine 104 may instruct the computing device 102 to perform the at least one security action of the plurality of security actions in response to receiving the at least one indication from the plurality of computer routines based on the analysis of the particular session interaction parameter.

In step 214, the illustrative program engine 104 may notify a second computing device associated with the particular entity. In some embodiments, the illustrative program engine 104 may notify the second computing device associated with the particular entity with information pertaining to the particular interaction session. In some embodiments, the illustrative program engine 104 may generate a notification that may be transmitted to the second computing device associated with the particular entity, where the generated notification includes data associated with the particular interaction session.

Figure 3:
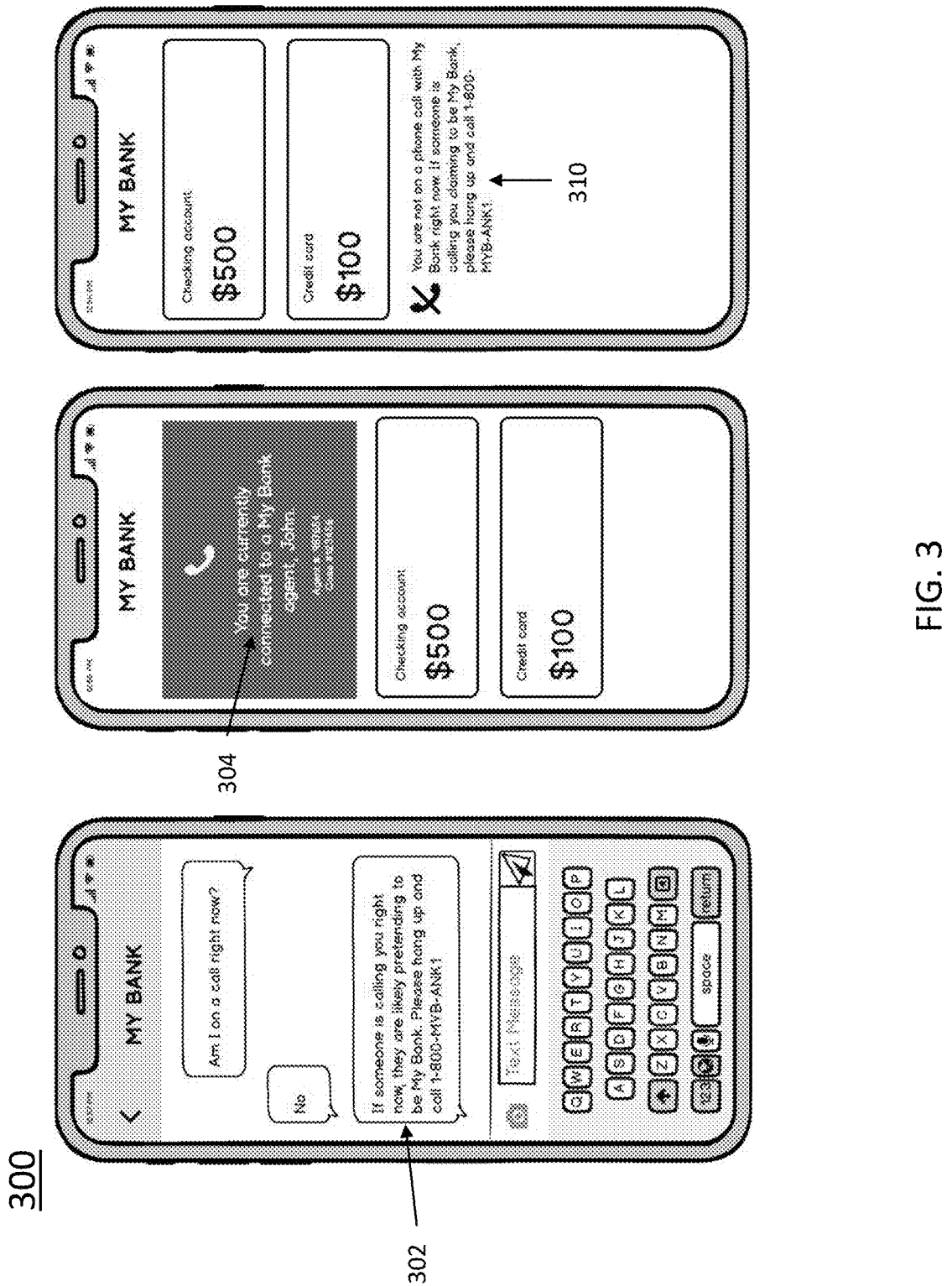
FIG. 3 depicts a block diagram of an exemplary computer-based system/platform in accordance with one or more embodiments of the present disclosure.

FIG. 3 depicts an exemplary diagram 300 illustrate exemplary graphical user interfaces (GUIs) involving aspects associated with the exemplary detection trigger condition module 118 consistent with exemplary aspects of certain embodiments of the present disclosure. In some embodiments, the GUIs may be provided by an application and shown on a display of a mobile device (e.g., the computing device 102 of FIG. 1). In some embodiments, prior to the GUIs being displayed in response to an incoming interaction session on the mobile device, a particular session interaction parameter (e.g., SIP certificate) 304 has been received at the mobile device to activate, for example, the application to detect at least one triggering condition 302 associated with the incoming interaction session. In some embodiments, when the particular session interaction parameter 304 fails to match a session interaction parameter associated with a particular entity, the application detects the at least one triggering condition 302 and displays the triggering condition 302 on the mobile device. In some embodiments, the GUIs may display a plurality of results of an execution of the plurality of computer routines 306 (not shown) to verify when the particular session interaction parameter is associated with the particular entity. In some embodiments, the GUIs may display a different plurality of results of a performance of a plurality of security actions 308 (not shown) to prevent an extraction and transmission of a generated notification 310 pertaining to information associated with the particular interaction session. In some embodiments, the GUIs may display the generated notification 310 that may be transmitted to a second computing device associated with the particular entity.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; knowledge corpus; stored audio recordings; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. In some embodiments, the server may store transactions and dynamically trained machine learning models. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a social media post, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD™, NetB SD™, OpenBSD™; (2) Linux™; (3) Microsoft Windows™; (4) OS X (MacOS)™; (5) MacOS 11™; (6) Solaris™; (7) Android™; (8) iOS™; (9) Embedded Linux™; (10) Tizen™; (11) WebOS™; (12) IBM i™; (13) IBM AIX™; (14) Binary Runtime Environment for Wireless (BREW)™; (15) Cocoa (API)™; (16) Cocoa Touch™; (17) Java Platforms™; (18) JavaFX™; (19) JavaFX Mobile™; (20) Microsoft DirectX™; (21) .NET Framework™; (22) Silverlight™; (23) Open Web Platform™; (24) Oracle Database™; (25) Qt™; (26) Eclipse Rich Client Platform™; (27) SAP NetWeaver™; (28) Smartface™; and/or (29) Windows Runtime™.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device. In at least one embodiment, the exemplary ASR system of the present disclosure, utilizing at least one machine-learning model described herein, may be referred to as exemplary software.

In some embodiments, exemplary inventive computer-based systems/platforms, exemplary inventive computer-based devices, and/or exemplary inventive computer-based components of the present disclosure may be configured to handle numerous concurrent tests for software agents that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999, 999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app, etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, the exemplary ASR system of the present disclosure, utilizing at least one machine-learning model described herein, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

The aforementioned examples are, of course, illustrative and not restrictive.

Figure 4:
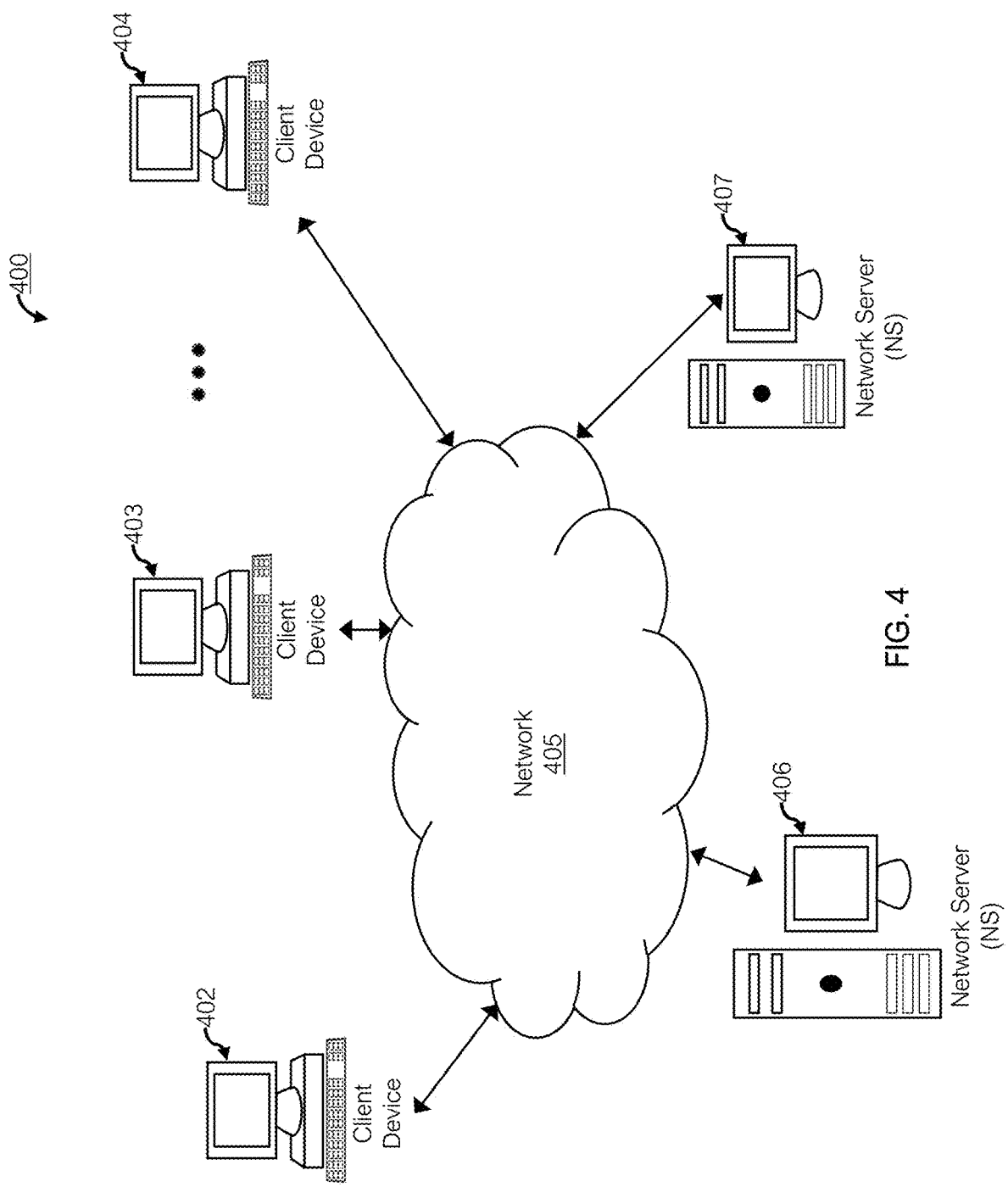
FIG. 4 depicts a block diagram of another exemplary computer-based system/platform in accordance with one or more embodiments of the present disclosure.

FIG. 4 depicts a block diagram of an exemplary computer-based system/platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 400 may be configured to automatically update at least one data record including at least one shared data point within a generated database of known queries based on a plurality of indicative markers and displayed via a computing device 102, as detailed herein. In some embodiments, the exemplary computer-based system/platform 400 may be based on a scalable computer and/or network architecture that incorporates varies strategies for assessing the data, caching, searching, and/or database connection pooling. An example of the scalable architecture is an architecture that is capable of operating multiple servers. In some embodiments, the exemplary inventive computing devices and/or the exemplary inventive computing components of the exemplary computer-based system/platform 400 may be configured to manage the exemplary detection trigger condition module 118 of the present disclosure, utilizing at least one machine-learning model described herein.

In some embodiments, referring to FIG. 4, members 402-404 (e.g., clients) of the exemplary computer-based system/platform 400 may include virtually any computing device capable of automatically updating, dynamically removing, and automatically restoring a plurality of data records within a generated database of known queries via a network (e.g., cloud network), such as network 405, to and from another computing device, such as servers 406 and 407, each other, and the like. In some embodiments, the member devices 402-404 may be personal computers, multiprocessor systems, microprocessor-based or programmable consumer electronics, network PCs, and the like. In some embodiments, one or more member devices within member devices 402-404 may include computing devices that connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 402-404 may include may launch one or more applications, such as Internet browsers, mobile applications, voice calls, video games, videoconferencing, and email, among others. In some embodiments, one or more member devices within member devices 402-404 may be configured to receive and to send web pages, and the like. In some embodiments, an exemplary detection trigger condition module 118 of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, .Net, QT, C, C++ and/or other suitable programming language. In some embodiments, one or more member devices within member devices 402-404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 405 may also include mass storage, such as network attached storage (NAS), a storage area network (SAN), a content delivery network (CDN) or other forms of computer or machine-readable media.

In some embodiments, the exemplary server 406 or the exemplary server 407 may be a web server (or a series of servers) running a network operating system, examples of which may include but are not limited to Microsoft Windows Server, Novell NetWare, or Linux. In some embodiments, the exemplary server 406 or the exemplary server 407 may be used for and/or provide cloud and/or network computing. Although not shown in FIG. 4, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 401-404.

In some embodiments and, optionally, in combination of any embodiment described above or below, for example, one or more exemplary computing member devices 402-404, the exemplary server 406, and/or the exemplary server 407 may include a specifically programmed software module that may be configured to calculate a correctness confidence value and modify the generated database of known queries based on the automatic updates of the exemplary detection trigger condition module 118.

Figure 5:
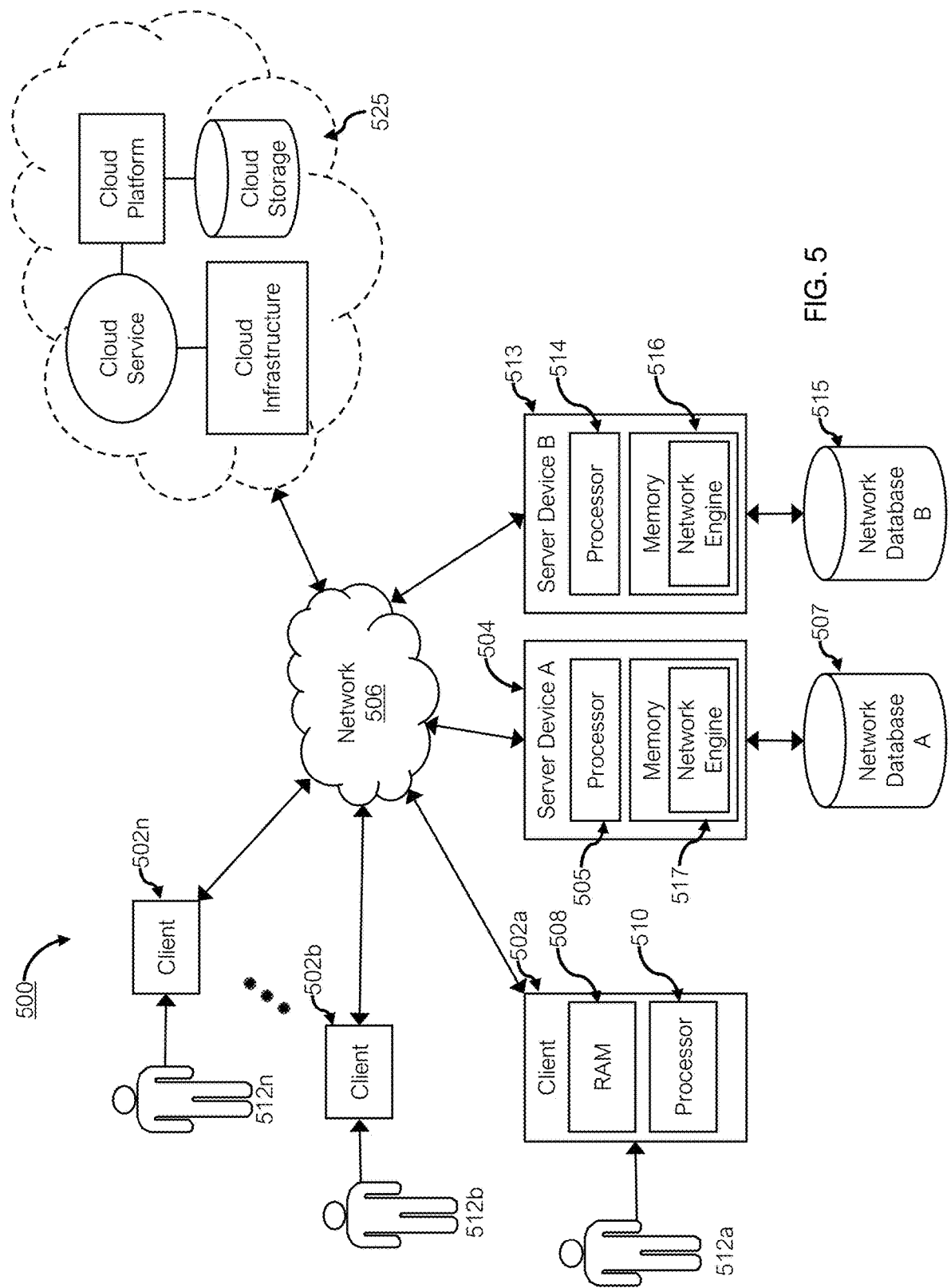
FIG. 5 is a block diagram depicting another exemplary computer-based system, in accordance with certain embodiments of the present disclosure.

FIG. 5 depicts a block diagram of another exemplary computer-based system/platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 502*a*, 502*b* thru 502*n* shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502*a*, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 502*a* through 502*n* may also comprise a number of external or internal devices such as a mouse, a CD-ROM, DVD, a physical or virtual keyboard, a display, a speaker, or other input or output devices. In some embodiments, examples of member computing devices 502*a* through 502*n* (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502*a* through 502*n* may be specifically programmed with one or more application programs in accordance with one or more principles/methodologies detailed herein. In some embodiments, member computing devices 502*a* through 502*n* may operate on any operating system capable of supporting a browser or browser-enabled application, such as Microsoft™ Windows™, and/or Linux. In some embodiments, member computing devices 502*a* through 502*n* shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502*a* through 502*n*, users, 512*a* through 512*n*, may communicate over the exemplary network 506 with each other and/or with other systems and/or devices coupled to the network 506. As shown in FIG. 5, exemplary server devices 504 and 513 may be also coupled to the network 506. Exemplary server device 504 may include a processor 505 coupled to a memory that stores a network engine 517. Exemplary server device 513 may include a processor 514 coupled to a memory 516 that stores a network engine. In some embodiments, one or more member computing devices 502*a* through 502*n* may be mobile clients. As shown in FIG. 5, the network 506 may be coupled to a cloud computing/architecture(s) 525. The cloud computing/architecture(s) 525 may include a cloud service coupled to a cloud infrastructure and a cloud platform, where the cloud platform may be coupled to a cloud storage.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 6:
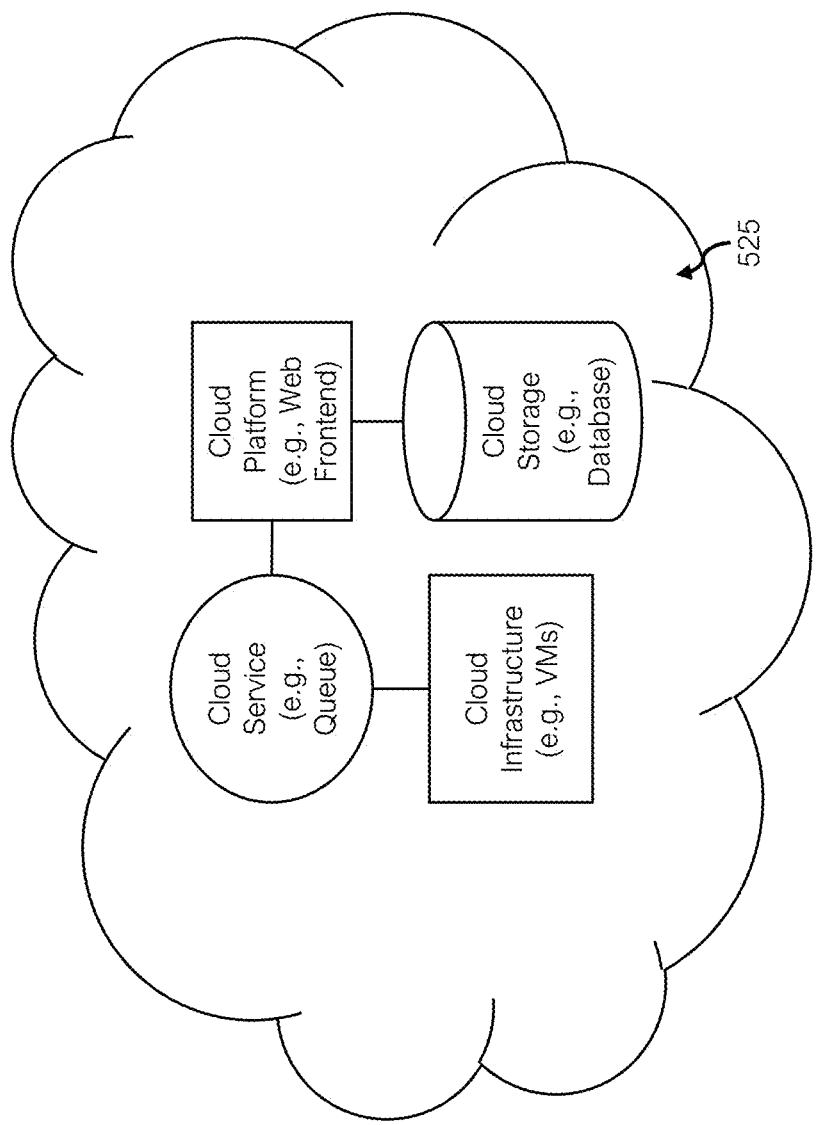
FIGS. 6 and 7 are diagrams illustrating implementations of cloud computing architecture/aspects with respect to which the disclosed technology may be specifically configured to operate, in accordance with one or more embodiments of the present disclosure.
Figure 7:
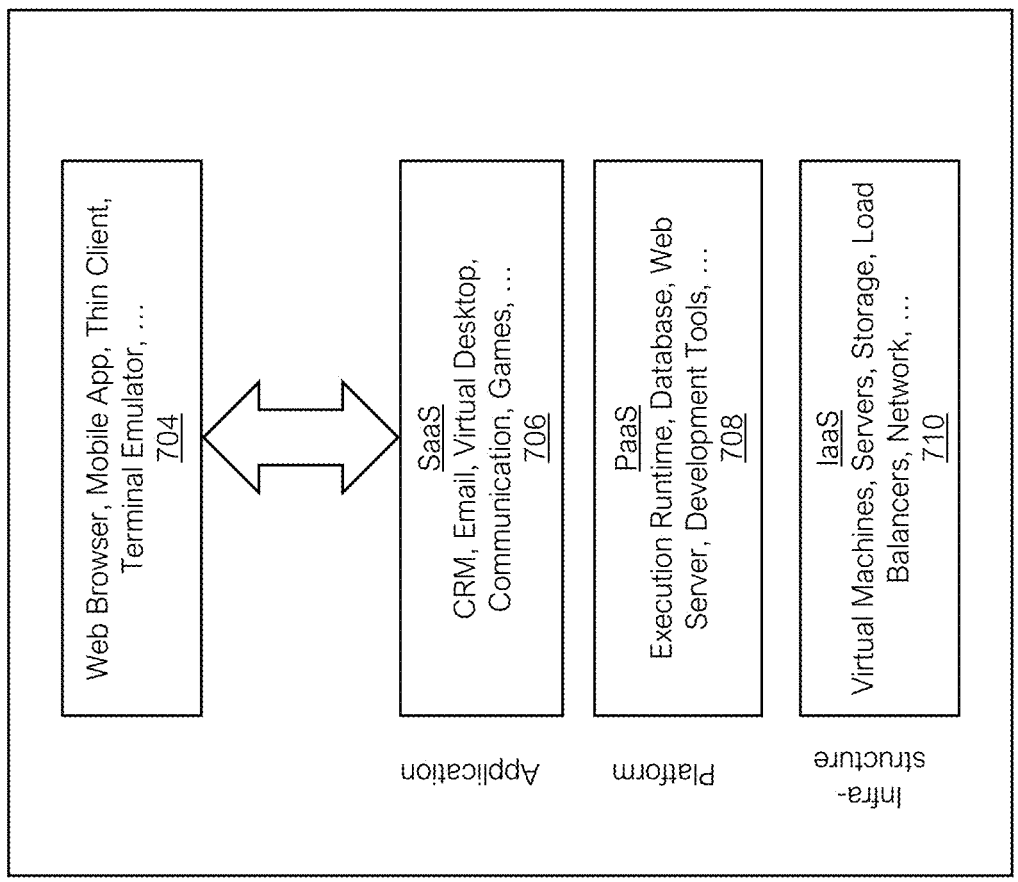

FIG. 6 and FIG. 7 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate. FIG. 6 illustrates an expanded view of the cloud computing/architecture(s) 525 found in FIG. 5. FIG. 7. illustrates the exemplary inventive computer-based components of the present disclosure may be specifically configured to operate in the cloud computing/architecture 525 as a source database 704, where the source database 704 may be a web browser. a mobile application, a thin client, and a terminal emulator. In FIG. 7, the exemplary inventive computer-based systems/platforms, the exemplary inventive computer-based devices, and/or the exemplary inventive computer-based components of the present disclosure may be specifically configured to operate in an cloud computing/architecture such as, but not limiting to: infrastructure a service (IaaS) 710, platform as a service (PaaS) 708, and/or software as a service (SaaS) 706.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

At least some aspects of the present disclosure will now be described with reference to the following numbered clauses.

Clause 1. A Method May Include:
  receiving, by one or more processors, from a computing device of a first user, a permission indicator identifying a permission by the first user to detect calls being received by the computing device;
  receiving, by the one or more processors, from the computing device, an indication of a particular call being received from a second user at a particular phone number, the second user claiming to be associated with a particular entity;
  detecting, by the one or more processors, a triggering condition to verify when the particular phone number is associated with the particular entity;
  instructing, by the one or more processors and responsive to detecting the triggering condition, the computing device to execute a computer routine to verify when the particular phone number is associated with the particular entity;
  receiving, by the one or more processors, an indication from the computer routine when the particular phone number is not associated with the particular entity;
  instructing, by the one or more processors, the computing device to perform at least one security action; and
  instructing, by the one or more processors, to notify a second computing device associated with the particular entity with information pertaining to the particular call.

Clause 2. The method according to clause 1, where the detecting of a triggering condition includes detecting an input from the user at the computing device.

Clause 3. The method according to clause 1 or 2, where the detecting of a triggering condition includes monitoring content of the particular call between the first user and the second user.

Clause 4. The method according to clause 1, 2 or 3, further including instructing, by the one or more processors, the computing device to update a graphical user interface (GUI) associated with the particular call to display to the first user a GUI element, the GUI element operable to execute the computer routine.

Clause 5. The method according to clause 1, 2, 3 or 4, where the computer routine is executed by a messaging application.

Clause 6. The method according to clause 1, 2, 3, 4 or 5, where the computer routine is executed by an application associated with the entity.

Clause 7. The method according to clause 1, 2, 3, 4, 5 or 6, where the messaging application is automatically operated by a bot on behalf of the first user.

Clause 8. The method according to clause 1, 2, 3, 4, 5, 6 or 7, where the messaging application is automatically operated by a bot on behalf of the first user.

Clause 9. The method according to clause 1, 2, 3, 4, 5, 6, 7 or 8, where the indication that the particular phone number is not associated with the particular entity further indicates that the second user is engaging a man-in-the-middle attack against the first user and the particular entity.

Clause 10. The method according to clause 1, 2, 3, 4, 5, 6, 7, 8 or 9, where the security action includes at least one of: conferencing a user legitimately associated with the particular entity into the particular call, causing the particular call to be hung up, causing the user legitimately associated with the particular entity to hang up another call with the second user.

Clause 11. The method according to clause 1, 2, 3, 4, 5, 6, 7, 8, 9 or 10, where the computer routine to verify when the particular phone number is not associated with the particular entity is based on at least on an indication of whether the particular call is inbound or outbound according to the first user, an indication of whether the particular call is inbound or outbound according to a call center associated with the particular entity, information of agents associated with the call center, or call logs of the call center.

Clause 12. A method may include:
  receiving, by one or more processors, from a computing device of a first user, a permission indicator identifying a permission by the first user to detect calls being received by the computing device;
  receiving, by the one or more processors, from the computing device, an indication of a particular call being received from a second user at a particular phone number, the second user claiming to be associated with a particular entity;
  detecting, by the one or more processors, a triggering condition to verify when the particular phone number is associated with the particular entity;
  instructing, by the one or more processors and responsive to detecting the triggering condition, the computing device to execute a computer routine to verify when the particular phone number is associated with the particular entity;
  receiving, by the one or more processors, an indication from the computer routine when the particular phone number is not associated with the particular entity;
  instructing, by the one or more processors, the computing device to perform at least one security action;
  instructing, by the one or more processors, to notify a second computing device associated with the particular entity with information pertaining to the particular call; and
  automatically instructing, by the one or more processors, the computing device to update a graphical user interface (GUI) associated with the particular call to display to the first user a GUI element, the GUI element operable to execute the computer routine.

Clause 13. The method according to clause 12, where the detecting of a triggering condition includes detecting an input from the user at the computing device.

Clause 14. The method according to clause 12 or 13, where the detecting of a triggering condition includes monitoring content of the particular call between the first user and the second user.

Clause 15. The method according to clause 12, 13 or 14, where the indication that the particular phone number is not associated with the particular entity further indicates that the second user is engaging a man-in-the-middle attack against the first user and the particular entity.

Clause 16. The method according to clause 12, 13, 14 or 15, where the security action includes at least one of: conferencing a user legitimately associated with the particular entity into the particular call, causing the particular call to be hung up, causing the user legitimately associated with the particular entity to hang up another call with the second user.

Clause 17. The method according to clause 12, 13, 14, 15 or 16, where the computer routine to verify when the particular phone number is not associated with the particular entity is based on at least on an indication of whether the particular call is inbound or outbound according to the first user, an indication of whether the particular call is inbound or outbound according to a call center associated with the particular entity, information of agents associated with the call center, or call logs of the call center.

Clause 18. A system may include:
a non-transient computer memory, storing software instructions;
at least one processor of a first computing device associated with a user;
where, when the at least one processor executes the software instructions, the first computing device is programmed to:
receive, by one or more processors, from a computing device of a first user, a permission indicator identifying a permission by the first user to detect calls being received by the computing device;
receive, by the one or more processors, from the computing device, an indication of a particular call being received from a second user at a particular phone number, the second user claiming to be associated with a particular entity;
detect, by the one or more processors, a triggering condition to verify when the particular phone number is associated with the particular entity;
instruct, by the one or more processors and responsive to detecting the triggering condition, the computing device to execute a computer routine to verify when the particular phone number is associated with the particular entity;
receive, by the one or more processors, an indication from the computer routine when the particular phone number is not associated with the particular entity;
instruct, by the one or more processors, the computing device to perform at least one security action; and
instruct, by the one or more processors, to notify a second computing device associated with the particular entity with information pertaining to the particular call.

Clause 19. The system according to clause 18, where the software instructions further include automatically instructing, by the one or more processors, the computing device to update a graphical user interface (GUI) associated with the particular call to display to the first user a GUI element, the GUI element operable to execute the computer routine.

Clause 20. The system according to clause 18 or 19, where the security action includes at least one of: conferencing a user legitimately associated with the particular entity into the particular call, causing the particular call to be hung up, and/or causing the user legitimately associated with the particular entity to hang up another call with the second user.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

What is claimed is:

1. A method, comprising:
receiving, by at least one processors, from a first computing device of a first user, a permission indicator identifying a permission by the first user to detect calls being received by the first computing device;
receiving, by the at least one processors, from the first computing device, an indication of a particular call being received from a second user at a particular phone number, the second user claiming to be associated with a particular entity;
detecting, by the at least one processors, a triggering condition to verify when the particular phone number is associated with the particular entity; and
instructing, by the at least one processors and responsive to detecting the triggering condition, the first computing device to execute a computer routine, comprising at least one machine learning model, to verify when the particular phone number is associated with the particular entity by inputting the particular phone number, the particular entity, or both into the at least one machine learning model trained to output at least one of:
an entity-verification determination that the particular phone number is associated with the particular entity,
a security risk determination that the particular phone number is associated with an entity different from the particular entity,
at least one security action based on the security risk determination, or
at least one instruction, based on the security risk determination, transmitted to:
the first computing device to perform the at least one security action,
a second computing device associated with the particular entity with information pertaining to the particular call based on the security risk determination,
or both.

2. The method of claim 1, wherein the detecting of the triggering condition comprises detecting an input from the first user at the first computing device.

3. The method of claim 1, wherein the detecting of the triggering condition comprises monitoring content of the particular call between the first user and the second user.

4. The method of claim 1, further comprising:
instructing, by the at least one processors, the first computing device to update a graphical user interface (GUI)

associated with the particular call to display to the first user a GUI element, the GUI element operable to execute the computer routine.

5. The method of claim 1, wherein the computer routine is executed by a messaging application.

6. The method of claim 1, wherein the computer routine is executed by an application associated with the particular entity.

7. The method of claim 5, wherein the messaging application is automatically operated by a bot on behalf of the first user.

8. The method of claim 1, wherein the indication that the particular phone number is associated with the entity different from the particular entity further indicates that the second user is engaging a man-in-the-middle attack against the first user and the particular entity.

9. The method of claim 1, wherein the at least one security action comprises at least one of: conferencing a user legitimately associated with the particular entity into the particular call, causing the particular call to be hung up, or causing the user legitimately associated with the particular entity to hang up another call with the second user.

10. The method of claim 1, wherein the computer routine to verify when the particular phone number is associated with the entity different from the particular entity is based on at least one of: a first indication of whether the particular call is inbound or outbound according to the first user, a second indication of whether the particular call is inbound or outbound according to a call center associated with the particular entity, information of agents associated with the call center, or call logs of the call center.

11. A method, comprising:
receiving, by at least one processors, from a first computing device of a first user, a permission indicator identifying a permission by the first user to detect calls being received by the first computing device;
receiving, by the at least one processors, from the first computing device, an indication of a particular call being received from a second user at a particular phone number, the second user claiming to be associated with a particular entity;
detecting, by the at least one processors, a triggering condition to verify when the particular phone number is associated with the particular entity;
instructing, by the at least one processors and responsive to detecting the triggering condition, the first computing device to execute a computer routine, comprising at least one machine learning model, to verify when the particular phone number is associated with the particular entity by inputting the particular phone number, the particular entity, or both into the at least one machine learning model trained to output at least one of:
an entity-verification determination that the particular phone number is associated with the particular entity,
a security risk determination that the particular phone number is associated with an entity different from the particular entity,
at least one security action based on the security risk determination, or
at least one instruction, based on the security risk determination, transmitted to:
the first computing device to perform the at least one security action,
a second computing device associated with the particular entity with information pertaining to the particular call based on the security risk determination,
or both; and automatically instructing, by the at least one processor, the first computing device to update a graphical user interface (GUI) associated with the particular call to display to the first user a GUI element, the GUI element operable to execute the computer routine.

12. The method of claim 11, wherein the detecting of the triggering condition comprises detecting an input from the first user at the first computing device.

13. The method of claim 11, wherein the detecting of the triggering condition comprises monitoring content of the particular call between the first user and the second user.

14. The method of claim 11, wherein the indication that the particular phone number is associated with the entity different from the particular entity further indicates that the second user is engaging a man-in-the-middle attack against the first user and the particular entity.

15. The method of claim 11, wherein the at least one security action comprises at least one of: conferencing a user legitimately associated with the particular entity into the particular call, causing the particular call to be hung up, or causing the user legitimately associated with the particular entity to hang up another call with the second user.

16. The method of claim 11, wherein the computer routine to verify when the particular phone number is associated with the entity different from the particular entity is based on at least one of: a first indication of whether the particular call is inbound or outbound according to the first user, a second indication of whether the particular call is inbound or outbound according to a call center associated with the particular entity, information of agents associated with the call center, or call logs of the call center.

17. A system, comprising:
a non-transient computer memory, storing software instructions; and
at least one processor;
wherein the at least one processor is configured to executes the software instructions, that causes the at least one processor to:
receive from a first computing device of a first user, a permission indicator identifying a permission by the first user to detect calls being received by the first computing device;
receive from the first computing device, an indication of a particular call being received from a second user at a particular phone number, the second user claiming to be associated with a particular entity;
detect a triggering condition to verify when the particular phone number is associated with the particular entity;
instruct responsive to detecting the triggering condition, the first computing device to execute a computer routine, comprising at least one machine learning model, to verify when the particular phone number is associated with the particular entity by inputting the particular phone number, the particular entity, or both into the at least one machine learning model trained to output at least one of:
an entity-verification determination that the particular phone number is associated with the particular entity,
a security risk determination that the particular phone number is associated with an entity different from the particular entity,
at least one security action based on the security risk determination, or at least one instruction, based on the security risk determination, transmitted to:
the first computing device to perform the at least one security action,
a second computing device associated with the particular entity with information pertaining to the particular call based on the security risk determination,
or both.

18. The system of claim 17, wherein the at least one processor is further configured to automatically instruct the first computing device to update a graphical user interface (GUI) associated with the particular call to display to the first user a GUI element, the GUI element operable to execute the computer routine.

19. The system of claim 17, wherein the at least one security action comprises at least one of: conferencing a user legitimately associated with the particular entity into the particular call, causing the particular call to be hung up, or causing the user legitimately associated with the particular entity to hang up another call with the second user.

* * * * *